US011308716B1

(12) United States Patent
Richter

(10) Patent No.: US 11,308,716 B1
(45) Date of Patent: Apr. 19, 2022

(54) TAILORING A COMPUTER-GENERATED REALITY EXPERIENCE BASED ON A RECOGNIZED OBJECT

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 153 days.

(21) Appl. No.: 16/583,151

(22) Filed: Sep. 25, 2019

Related U.S. Application Data

(60) Provisional application No. 62/737,775, filed on Sep. 27, 2018.

(51) Int. Cl.
*G06V 20/20* (2022.01)
*G06T 19/00* (2011.01)

(52) U.S. Cl.
CPC ............ *G06V 20/20* (2022.01); *G06T 19/006* (2013.01)

(58) Field of Classification Search
None
See application file for complete search history.

(56) References Cited

U.S. PATENT DOCUMENTS

| 10,777,010 | B1* | 9/2020 | Patel | G06T 19/006 |
| 2014/0285522 | A1* | 9/2014 | Kim | G06Q 30/0601 |
| | | | | 345/633 |
| 2018/0034867 | A1* | 2/2018 | Zahn | H04L 51/046 |
| 2018/0045963 | A1* | 2/2018 | Hoover | G02B 27/0172 |
| 2019/0114828 | A1* | 4/2019 | Trowbridge | G06T 15/80 |
| 2019/0340816 | A1* | 11/2019 | Rogers | H04L 67/22 |

* cited by examiner

*Primary Examiner* — Peter Hoang
(74) *Attorney, Agent, or Firm* — Fernando & Partners, LLP

(57) ABSTRACT

In various implementations, a method is performed at a device including a non-transitory memory and one or more processors coupled with the non-transitory memory. In some implementations, the method includes detecting a representation of an object that is associated with computer-generated reality (CGR) content. In some implementations, the method includes obtaining a user environment map characterizing a user environment, wherein the user environment is limited by a volumetric region around the device. In some implementations, the method includes mapping a portion of the CGR content associated with the object to a portion of the user environment map. In some implementations, the method includes synthesizing a CGR environment in accordance with the mapping.

24 Claims, 9 Drawing Sheets

TAILORING A COMPUTER-GENERATED REALITY EXPERIENCE BASED ON A RECOGNIZED OBJECT

CROSS REFERENCE TO RELATED APPLICATIONS

This application claims priority to U.S. patent application No. 62/737,775, filed on Sep. 27, 2018, which is hereby incorporated by reference in its entirety.

TECHNICAL FIELD

The present disclosure generally relates to computer-generated reality (CGR), and in particular, to systems, methods, and devices for tailoring a CGR experience based on a recognized object.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience VR content by using a head-mounted device (HMD) that encloses the user's field-of-view and is tethered to a computer. As another example, a user may experience AR content by wearing an HMD that still allows the user to see his/her surroundings (e.g., glasses with optical see-through). As yet another example, a user may experience AR content superimposed on a live video feed of the user's environment on a handheld display (e.g., an AR-enabled mobile phone or tablet).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
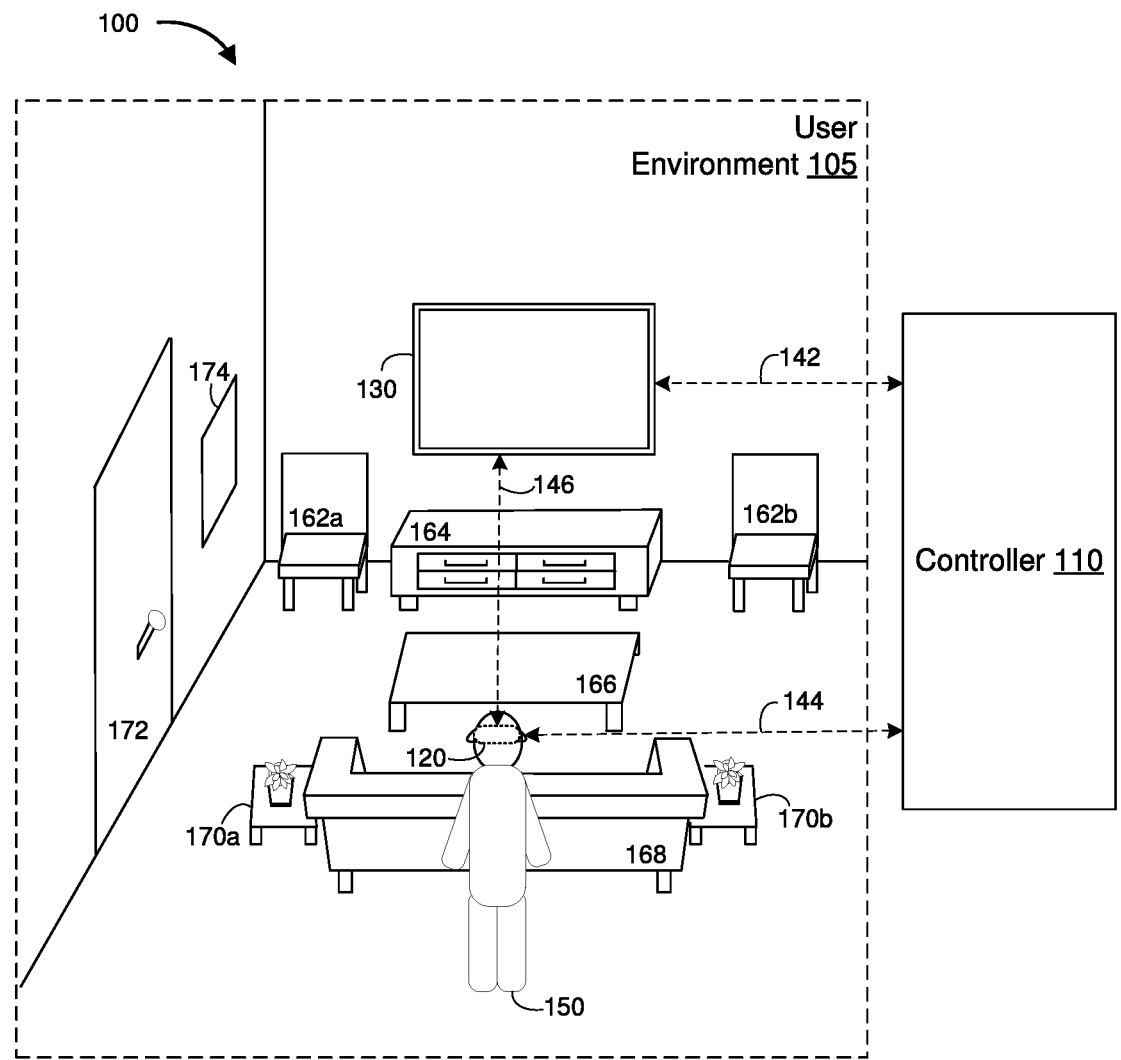
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for synthesizing a CGR environment. In various implementations, a method is performed at a device including a non-transitory memory and one or more processors coupled with the non-transitory memory. In some implementations, the method includes detecting a representation of an object that is associated with computer-generated reality (CGR) content. In some implementations, the method includes obtaining a user environment map characterizing a user environment, wherein the user environment is bounded by depth information characterizing a volumetric region around the device. In some implementations, the method includes mapping a portion of the CGR content associated with the object to a portion of the user environment map. In some implementations, the method includes synthesizing a CGR environment in accordance with the mapping.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Various implementations described herein provide methods and devices for tailoring a computer-generated reality (CGR) experience based on a recognized object. For example, CGR content associated with the recognized object is included in the CGR experience in order to make the CGR experience more relevant to the recognized object. Skinning the CGR experience to include CGR content associated with an object makes the CGR experience appear more relevant to the recognized object.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110, a computer-generated reality (CGR) device 120 that presents a CGR experience, and an optional display device 130.

In some implementations, the controller 110 is configured to manage and coordinate a CGR experience for a user 150. In some implementations, the controller 110 includes a suitable combination of software, firmware, and/or hardware. The controller 110 is described in greater detail below with respect to FIG. 2. In some implementations, the controller 110 is a computing device that is local or remote relative to a user environment 105 where the user 150 is located. For example, the controller 110 is a local server located within the user environment 105. In another example, the controller 110 is a remote server located outside of the user environment 105 (e.g., a cloud server, central server, etc.).

In some implementations, the controller 110 is communicatively coupled with the CGR device 120 via one or more wired or wireless communication channels 144 (e.g., BLUETOOTH, IEEE 802.11x, IEEE 802.16x, IEEE 802.3x, etc.). In some implementations, the controller 110 is communicatively coupled with the display device 130 via one or more wired or wireless communication channels 142 (e.g., BLUETOOTH, IEEE 802.11x, IEEE 802.16x, IEEE 802.3x, etc.). In some implementations, the CGR device 120 is communicatively coupled with the display device 130 via one or more wired or wireless communication channels 146 (e.g., BLUETOOTH, IEEE 802.11x, IEEE 802.16x, IEEE 802.3x, etc.).

In some implementations, the CGR device 120 corresponds to a head-mounted device (HMD), tablet, mobile phone, wearable computing device, or the like. In some implementations, the CGR device 120 is configured to present a CGR experience to the user 150. In some implementations, the CGR device 120 includes a suitable combination of software, firmware, and/or hardware. The CGR device 120 is described in greater detail below with respect to FIG. 3. In some implementations, the functionalities of the controller 110 and/or the display device 130 are provided by and/or combined with the CGR device 120.

According to some implementations, the CGR device 120 presents a CGR experience to the user 150 while the user 150 is virtually and/or physically present within the user environment 105. In some implementations, presenting a CGR experience includes presenting an AR experience. In some implementations, while presenting the AR experience, the CGR device 120 is configured to present AR content and to enable video pass-through of the user environment 105 (e.g., the CGR device 120 corresponds to an AR-enabled mobile phone or tablet). In some implementations, while presenting an AR experience, the CGR device 120 is configured to present AR content and to enable optical see-through of the user environment 105 (e.g., the CGR device 120 corresponds to an AR-enabled glasses).

In some implementations, presenting a CGR experience includes presenting a VR experience. In some implementations, while presenting a VR experience, the CGR device 120 is configured to present VR content and to optionally enable video pass-through of the user environment 105 (e.g., the CGR device 120 corresponds to a VR-enabled HMD). As shown in FIG. 1, for example, the user environment 105 includes chairs 162a and 162b, a credenza 164, a coffee table 166, a sofa 168, end tables 170a and 170b, a door 172, and a painting 174. As shown in FIG. 1, the user 150 is standing behind the sofa 168 facing the display device 130.

In some implementations, the user 150 wears the CGR device 120 on his/her head (e.g., as shown in FIG. 1). As such, the CGR device 120 includes one or more CGR displays provided to display the CGR content. For example, the CGR device 120 encloses the field-of-view of the user 150. In some implementations, the CGR device 120 is replaced with a CGR chamber, enclosure, or room configured to present CGR content in which the user 150 does not wear the CGR device 120. In some implementations, the user 150 holds the CGR device 120 in his/her hand(s).

In some implementations, the optional display device 130 is configured to present media content (e.g., video and/or audio content) to the user 150. In some implementations, the display device 130 corresponds to a television (TV) or a computing device such as a desktop computer, kiosk, laptop computer, tablet, mobile phone, wearable computing device, or the like. In some implementations, the display device 130 includes a suitable combination of software, firmware, and/or hardware. The display device 130 is described in greater detail below with respect to FIG. 4.

Figure 2:
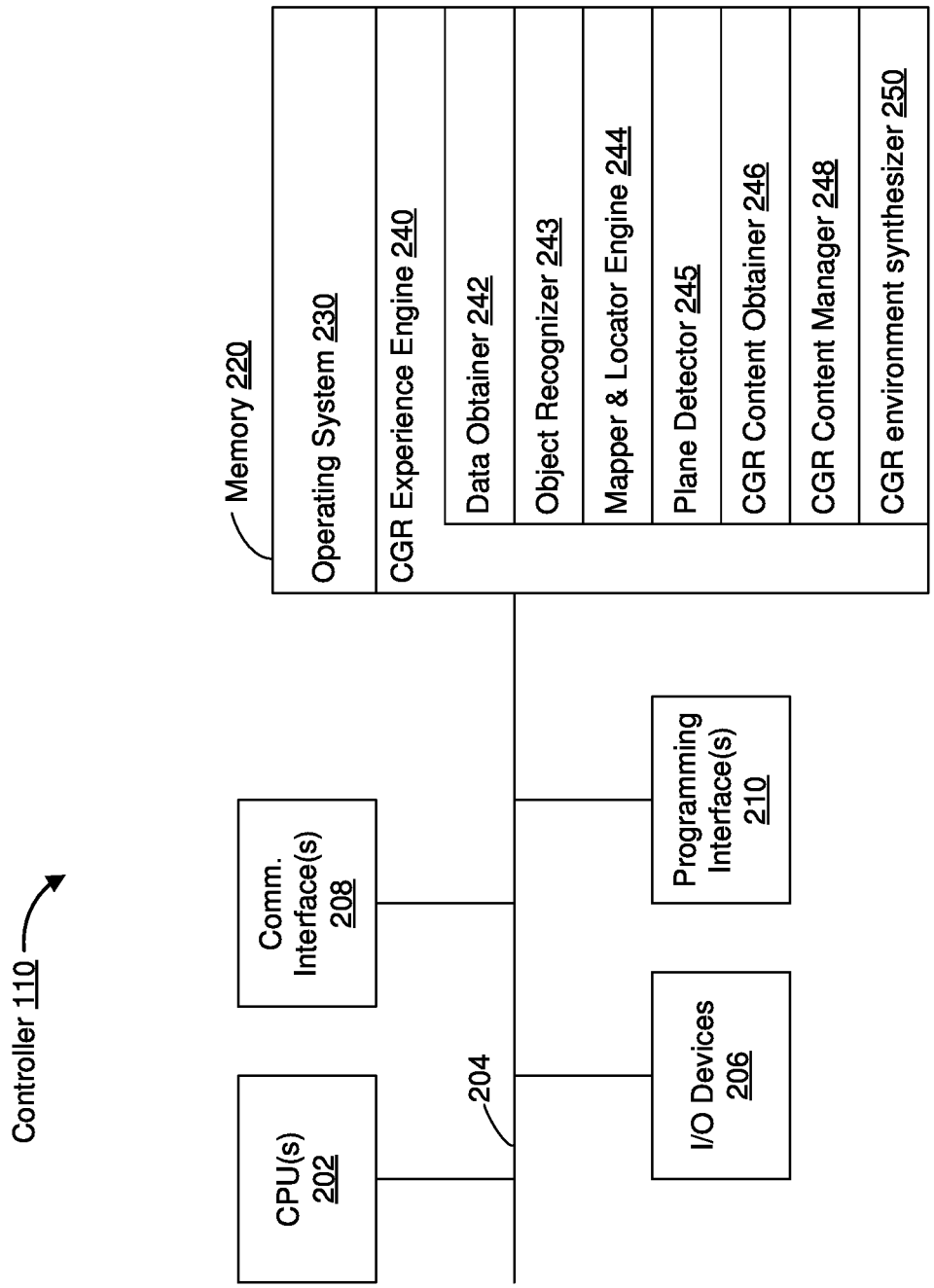
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDER- BOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience engine 240.

The operating system 230 includes procedures for handling various basic system services and for performing hardware dependent tasks. In some implementations, the CGR experience engine 240 is configured to manage and coordinate one or more CGR experiences for one or more users (e.g., a single CGR experience for one or more users, or multiple CGR experiences for respective groups of one or more users). To that end, in various implementations, the CGR experience engine 240 includes a data obtainer 242, a mapper and locator engine 244, a plane detector 245, a CGR content obtainer 246, a CGR content manager 248, and a data transmitter 250.

In some implementations, the data obtainer 242 is configured to obtain data (e.g., presentation data, user interaction data, sensor data, location data, etc.) from at least one of sensors in the user environment 105, sensors associated with the controller 110, the CGR device 120, and the display device 130. For example, the data obtainer 242 obtains sensor data from the CGR device 120 that includes image data from external facing image sensors of the CGR device 120, wherein the image data corresponds to images or a video stream capturing the user environment 105. To that end, in various implementations, the data obtainer 242 includes instructions and/or logic therefor, and heuristics and metadata therefor.

In some implementations, the object recognizer 243 recognizes an object in the user environment 105. In some implementations, the object recognizer 243 detects a representation of the object in the data obtained by the data obtainer 242. In some implementations, the object recognizer 243 recognizes objects that are associated with CGR content. For example, in some implementations, the object recognizer 243 identifies all objects in the user environment 105, and filters out objects that are not associated with any CGR content. In some implementations, the object recognizer 243 recognizes multiple objects with CGR content, and selects the object with the most CGR content. In some implementations, the object recognizer 243 selects the object with the most recent CGR content. In some implementations, the object recognizer 243 recognizes a real-world object that is present in the user environment 105. In some implementations, the object recognizer 243 recognizes a virtual object that is present in the user environment 105. Referring to the example of FIG. 1, the object recognizer 243 detects a representation of the painting 174 in the data obtained by the data obtainer 242 because the painting 174 is associated with CGR content. To that end, in various implementations, the object recognizer 243 includes instructions and/or logic therefor, and heuristics and metadata therefor.

In some implementations, the mapper and locator engine 244 is configured to obtain a user environment map that characterizes the user environment 105. For example, in some implementations, the mapper and locator engine 244 generates the user environment map based on the data obtained by the data obtainer 242. In some implementations, the mapper and locator engine 244 tracks the position/location of the CGR device 120 or the user 150 with respect to the user environment 105. In some implementations, the user 150 is physically present in the user environment 105. In such implementations, the mapper and locator engine 244 synthesizes a mesh map of the user environment 105 based on locality data (e.g., sensor data characterizing the user environment 105) from at least one of sensors in the user environment 105, sensors associated with the controller 110, the CGR device 120, and the display device 130. In some implementations, the user 150 is virtually present in the user environment 105. In such implementations, the mapper and locator engine 244 synthesizes the user environment map by identifying boundaries of the user environment 105 and objects that are present in the user environment 105.

In some implementations, the mapper and locator engine 244 is also configured to determine the location and orientation of the CGR device 120 or the user 150 relative to one or more reference points (e.g., an object) in the user environment 105 (e.g., the center of mass of the object or another point) or the user environment map of the user environment 105. According to some implementations, the mapper and locator engine 244 determines the orientation and location of the CGR device 120 based on one or more known localization techniques. To that end, in various implementations, the mapper and locator engine 244 includes instructions and/or logic therefor, and heuristics and metadata therefor.

In some implementations, the plane detector 245 is configured to detect planes (e.g., horizontal, vertical, or angled) within the user environment map. In some implementations, the plane detector 245 detects planes onto which CGR content can be displayed. In some implementations, the plane detector 245 identifies all planes, and filters out planes that are not suitable for displaying CGR content (e.g., the plane detector 245 filters out planes that have less area than a threshold area). According to some implementations, the plane detector 245 detects the planes based on one or more known localization techniques. In some implementations, the plane detector 245 is also configured to filter planes that do not satisfy spatial criteria (e.g., planes that are smaller than a threshold size). For example, in some implementations, the plane detector 245 filters out planes based on the CGR content associated with the object recognized by the object recognizer 243. For example, the plane detector 245 filters out planes that are not suitable (e.g., too small or too large) for displaying the CGR content associated with the recognized object. Referring to the example of FIG. 1, the plane detector 245 filters out planes that are not suitable for displaying CGR content associated with the painting 174. To that end, in various implementations, the plane detector 245 includes instructions and/or logic therefor, and heuristics and metadata therefor.

In some implementations, the CGR content obtainer 246 is configured to obtain (e.g., receive, retrieve, or generate) CGR content associated with the object recognized by the object recognizer 243. In some implementations, the CGR content obtainer 246 obtains the CGR content associated with the recognized object from a datastore that stores CGR content for various objects. Referring to the example of FIG. 1, the CGR content obtainer 246 obtains CGR content associated with the painting 174. To that end, in various implementations, the CGR content obtainer 246 includes instructions and/or logic therefor, and heuristics and metadata therefor.

In various implementations, the CGR content manager 248 maps a portion of the CGR content associated with the object to a portion of the user environment map. In some implementations, the CGR content manager 248 is configured to select CGR content based on the user environment map. In some implementations, the CGR content manager 248 selects the CGR content based on the plane detected within the user environment map. For example, the CGR content manager 248 selects the CGR content based on the user's location and orientation relative to the user environment map and/or the surface area of the planes detected within the user environment map. In some implementations, the CGR content manager 248 is also configured to manage and coordinate the presentation of the CGR content as the user's orientation and location changes relative to the user environment 105 or the user interacts with the CGR content. Referring to the example of FIG. 1, the CGR content manager 248 maps a portion of the CGR content associated with the painting 174 to the user environment map. To that end, in various implementations, the CGR content manager 248 includes instructions and/or logic therefor, and heuristics and metadata therefor.

In some implementations, the CGR environment synthesizer 250 synthesizes a CGR environment in accordance with the mapping performed by the CGR content manager 248. In some implementations, the CGR environment synthesizer 250 composites the CGR content selected by the CGR content manager 248 with the user environment map. In some implementations, the CGR environment synthesizer 250 modifies an existing CGR environment to include the CGR content selected by the CGR content manager 248. Referring to the example of FIG. 1, the CGR environment synthesizer 250 synthesizes a CGR environment that includes at least a portion of the CGR content associated with the painting 174. To that end, in various implementations, the CGR environment synthesizer 250 includes instructions and/or logic therefor, and heuristics and metadata therefor.

Although the data obtainer 242, the object recognizer 243, the mapper and locator engine 244, the plane detector 245, the CGR content obtainer 246, the CGR content manager 248, and the CGR environment synthesizer 250 are shown as residing on a single device (e.g., the controller 110), it should be understood that in other implementations, any combination of the data obtainer 242, the object recognizer 243, the mapper and locator engine 244, the plane detector 245, the CGR content obtainer 246, the CGR content manager 248, and the CGR environment synthesizer 250 may be located in separate computing devices.

Moreover, FIG. 2 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
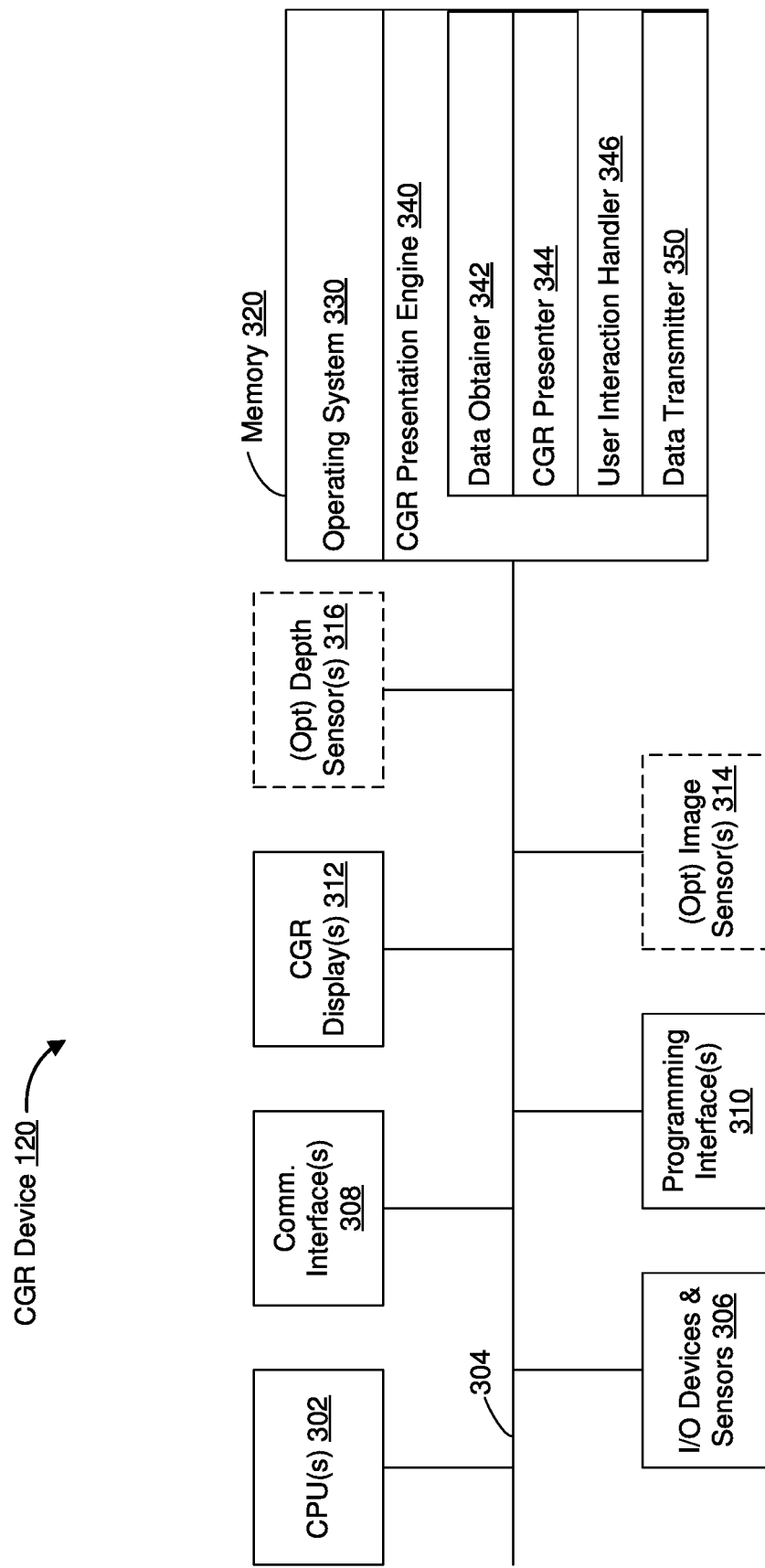
FIG. 3 is a block diagram of an example head-mounted device (HMD) in accordance with some implementations.

FIG. 3 is a block diagram of an example of the CGR device 120 (e.g., an HMD, mobile phone, or tablet) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the CGR device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, one or more optional depth sensors 316, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more CGR displays 312 are configured to present the CGR experience to the user. In some implementations, the one or more CGR displays 312 are also configured to present flat video content to the user (e.g., a 2-dimensional or "flat" AVI, FLV, WMV, MOV, MP4, or the like file associated with a TV episode or a movie, or live video pass-through of the user environment 105). In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the CGR device 120 includes a single CGR display. In another example, the CGR device 120 includes an CGR display for each eye of the user. In some implementations, the one or more CGR displays 312 are capable of presenting CGR content (e.g., AR, VR and/or MR content).

In some implementations, the one or more optional image sensors 314 are configured to obtain image data that corresponds to at least a portion of the face of the user that includes the eyes of the user. For example, the one or more optional image sensors 314 correspond to one or more RGB cameras (e.g., with a complementary metal-oxide-semiconductor (CMOS) image sensor or a charge-coupled device (CCD) image sensor), infrared (IR) image sensors, event-based cameras, and/or the like.

In some implementations, the one or more optional depth sensors 316 are configured to obtain depth data that corresponds to at least a portion of the face of the user and to synthesize a depth/mesh map of the face of the user, where the mesh map characterizes the facial topography of the user. For example, the one or more optional depth sensors 316 correspond to a structured light device, a time-of-flight device, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation engine 340.

The operating system 330 includes procedures for handling various basic system services and for performing hardware dependent tasks. In some implementations, the CGR presentation engine 340 is configured to present CGR content to the user via the one or more CGR displays 312. To that end, in various implementations, the CGR presentation engine 340 includes a data obtainer 342, a CGR presenter 344, a user interaction handler 346, and a data transmitter 350.

In some implementations, the data obtainer 342 is configured to obtain data (e.g., presentation data, user interaction data, sensor data, location data, etc.) from at least one of sensors in the user environment 105, sensors associated with the CGR device 120, the controller 110, and the display device 130. In some implementations, the data obtainer 342 obtains data indicative of a CGR environment synthesized by the controller 110. For example, the data obtainer 342 obtains data corresponding to the CGR environment synthesized by the CGR environment synthesizer 250 shown in FIG. 2. Referring to the example of FIG. 1, in some implementations, the data obtainer 342 obtains data corresponding to a CGR environment that includes at least a portion of the CGR content associated with the painting 174. To that end, in various implementations, the data obtainer 342 includes instructions and/or logic therefor, and heuristics and metadata therefor.

In some implementations, the CGR presenter 344 is configured to present a CGR environment via the one or more CGR displays 312. In some implementations, the CGR presenter 344 presents the CGR environment synthesized by the CGR environment synthesizer 250 shown in FIG. 2. Referring to the example of FIG. 1, the CGR presenter 344 presents a CGR environment that includes CGR content associated with the painting 174. In some implementations, the CGR presenter 344 is also configured to present flat video content via the one or more CGR displays 312. To that end, in various implementations, the CGR presenter 344 includes instructions and/or logic therefor, and heuristics and metadata therefor.

In some implementations, the user interaction handler 346 is configured to detect and interpret user interactions with the presented CGR content. For example, in some implementations, the CGR environment includes an affordance for presenting CGR content associated with an object detected in the user environment 105. In such implementations, the user interaction handler 346 detects a user input selecting the affordance, and the CGR presenter 344 presents the CGR content associated with the detected object in response to detecting the user input selecting the affordance. Referring to the example of FIG. 1, the user interaction handler 346 detects a selection of an affordance corresponding to a request to display CGR content associated with the painting 174, and the CGR presenter 344 presents the CGR content associated with the painting 174 in response to detecting the user input selecting the affordance. To that end, in various implementations, the user interaction handler 346 includes instructions and/or logic therefor, and heuristics and metadata therefor.

In some implementations, the data transmitter 350 is configured to transmit data (e.g., presentation data, location data, user interaction data, etc.) to at least one of the controller 110 and the display device 130. In some implementations, the CGR device 120 transmits images captured by a front-facing camera to the controller 110. To that end, in various implementations, the data transmitter 350 includes instructions and/or logic therefor, and heuristics and metadata therefor.

Although the data obtainer 342, the CGR presenter 344, the user interaction handler 346, and the data transmitter 350 are shown as residing on a single device (e.g., the CGR device 120), it should be understood that in other implementations, any combination of the data obtainer 342, the CGR presenter 344, the user interaction handler 346, and the data transmitter 350 may be located in separate computing devices.

In some implementations, the CGR device 120 includes a head-mountable device (HMD) that is worn by the user 150. In some implementations, the HMD includes an integrated display (e.g., a built-in display) that displays a CGR environment. In some implementations, the HMD includes a head-mountable enclosure. In various implementations, the head-mountable enclosure includes an attachment region to which another device with a display can be attached. For example, in some implementations, an electronic device (e.g., a smartphone or a tablet) can be attached to the head-mountable enclosure. In various implementations, the head-mountable enclosure is shaped to form a receptacle for receiving another device that includes a display (e.g., the electronic device). For example, in some implementations, an electronic device slides/snaps into or otherwise attaches to the head-mountable enclosure. In some implementations, the display of the device attached to the head-mountable enclosure presents (e.g., displays) the CGR environment. In various implementations, examples of the electronic device include smartphones, tablets, media players, laptops, etc.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
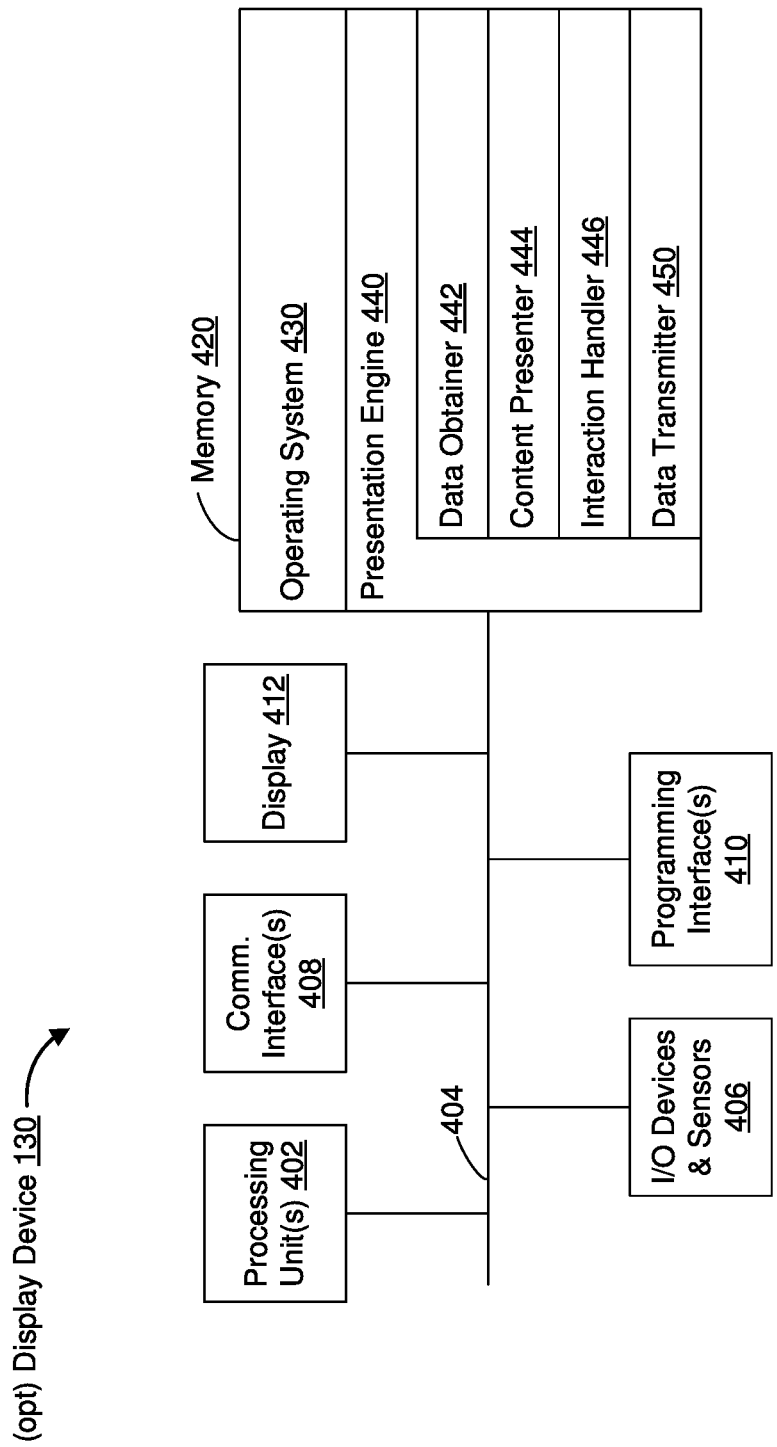
FIG. 4 is a block diagram of an example optional display device in accordance with some implementations.

FIG. 4 is a block diagram of an example of the optional display device 130 (e.g., a television (TV) or other display within the user environment 105) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the display device 130 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, a display 412, a memory 420, and one or more communication buses 404 for interconnecting these and various other components. In some implementations, the display device 130 is optionally controlled by a remote-control device, voice commands, the CGR device 120, or the like.

In some implementations, the one or more communication buses 404 include circuitry that interconnects and controls communications between system components. In some implementations, the one or more I/O devices and sensors 406 include at least one of one or more IR sensors, one or more physical buttons, one or more microphones, one or more speakers, one or more image sensors, one or more depth sensors, and/or the like.

In some implementations, the display 412 corresponds to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a presentation engine 440.

The operating system 430 includes procedures for handling various basic system services and for performing hardware dependent tasks. In some implementations, the presentation engine 440 is configured to present media content (e.g., video and/or audio content) to users via the display 412 and the one or more I/O devices and sensors 406 (e.g., one or more speakers). To that end, in various implementations, the presentation engine 440 includes a data obtainer 442, a content presenter 444, an interaction handler 446, and a data transmitter 450.

In some implementations, the data obtainer 442 is configured to obtain data (e.g., presentation data, user interaction data, etc.) from at least one of sensors in the operating environment 105, sensors associated with the display device 130, the controller 110, and the CGR device 120. In some implementations, the data obtainer 442 obtains data corresponding to the CGR environment synthesized by the CGR environment synthesizer 250 shown in FIG. 2. Referring to the example of FIG. 1, the data obtainer 442 obtains data corresponding to a CGR environment that includes CGR content associated with the painting 174. To that end, in various implementations, the data obtainer 442 includes instructions and/or logic therefor, and heuristics and metadata therefor.

In some implementations, the content presenter 444 is configured to render and/or display video content via the display 412. In some implementations, the content presenter 444 renders at least a portion of the CGR environment obtained by the data obtainer 442. Referring to the example of FIG. 1, the content presenter 444 presents a CGR environment that includes CGR content associated with the painting 174. To that end, in various implementations, the content presenter 444 includes instructions and/or logic therefor, and heuristics and metadata therefor.

In some implementations, the interaction handler 446 is configured to detect and interpret user interactions with the display device 130 (e.g., navigation, playback, tuning, volume adjustment, or the like commands). For example, in some implementations, the display device 130 displays an affordance that triggers modification of the CGR environment based on an object detected in the user environment 105. In such implementations, the interaction handler 446 detects a user input selecting the affordance, and the content presenter 444 modifies the CGR environment by displaying CGR content associated with the detect object. Referring to the example of FIG. 1, the interaction handler 446 detects a selection of an affordance corresponding to a request to display CGR content associated with the painting 174, and the content presenter 44 displays CGR content associated with the painting 174 in response to detecting selection of the affordance. To that end, in various implementations, the interaction handler 446 includes instructions and/or logic therefor, and heuristics and metadata therefor.

In some implementations, the data transmitter 450 is configured to transmit data (e.g., presentation data, user interaction data, etc.) to at least one of the controller 110 and the CGR device 120. In some implementations, the display device 130 includes a front-facing camera (e.g., a scene-facing camera), and the display device 130 transmits images captured by the front-facing camera to the controller 110 and/or the CGR device 120. To that end, in various implementations, the data transmitter 450 includes instructions and/or logic therefor, and heuristics and metadata therefor.

Although the data obtainer 442, the content presenter 444, the interaction handler 446, and the data transmitter 450 are shown as residing on a single device (e.g., the display device 130), it should be understood that in other implementations, any combination of the data obtainer 442, the content presenter 444, the interaction handler 446, and the data transmitter 450 may be located in separate computing devices.

Moreover, FIG. 4 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5:
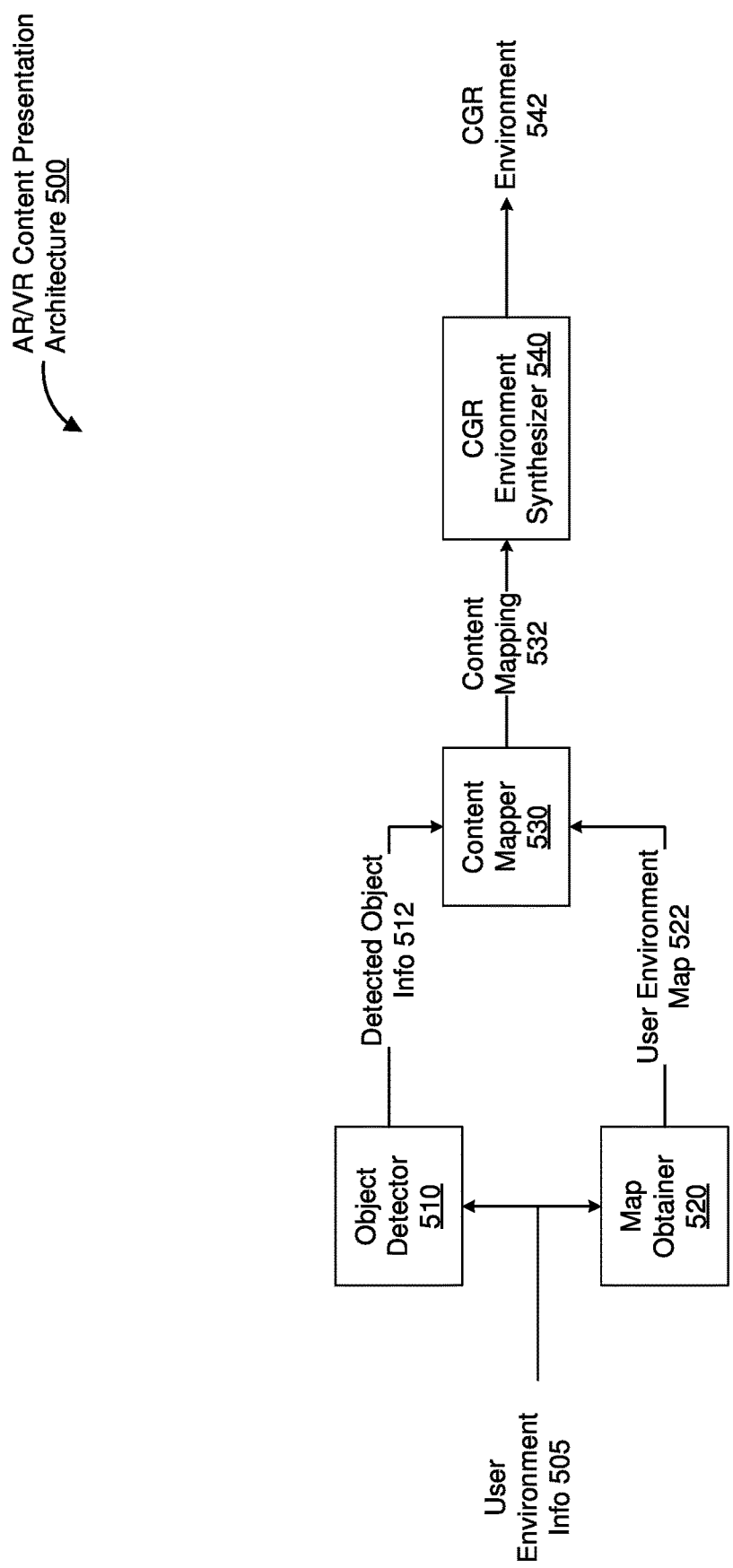
FIG. 5 is a block diagram of an example CGR content presentation architecture in accordance with some implementations.

FIG. 5 illustrates an example CGR content presentation architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the CGR content presentation architecture 500 detects a representation of an object that is associated with CGR content, obtains a user environment map that characterizes a user environment, maps a portion of the CGR content associated with the object to a portion of the user environment map, and synthesizes a CGR environment in accordance with the mapping.

As shown in FIG. 5, in some implementations, an object detector 510 (e.g., a portion of the object recognizer 243 shown in FIG. 2) detects a representation of an object that is associated with CGR content. In some implementations, the object detector 510 obtains user environment information 505, and the object detector 510 detects the representation of the object in the user environment information 505. In some implementations, the user environment information 505 includes one or more images of a user environment in which the user is physically or virtually present (e.g., the user environment 105 shown in FIG. 1). In some implementations, detected object information 512 provides an indication of the detected object.

In some implementations, a map obtainer 520 (e.g., a portion of the mapper and locator engine 244 and/or a portion of the plane detector 245) obtains a user environment map 522 that characterizes the user environment. In some implementations, the map obtainer 520 generates the user environment map 522 based on the user environment information 505. In some implementations, the user 150 is physically present in the user environment, and the map obtainer 520 generates a mesh map of the user environment. In some implementations, the user 150 is virtually present in the user environment, and the map obtainer 520 generates a map of the user environment that identifies the dimensions of the user environment and the virtual objects that are in the user environment.

In some implementations, a content mapper 530 (e.g., a portion of the CGR content obtainer 246 and/or a portion of the CGR content manager 248) generates a content mapping 532 that maps at least a portion of the CGR content associated with the object to a portion of the user environment map 522. In some implementations, the content mapping 532 indicates which of the CGR content associated with the object is to be displayed on which portion of the user environment.

In some implementations, a CGR environment synthesizer 540 (e.g., a portion of the CGR environment synthesizer 250 shown in FIG. 2) synthesizes a CGR environment 542 in accordance with the content mapping 532. In some implementations, the CGR environment synthesizer 540 synthesizes the CGR environment 542 by compositing the CGR content associated with the object with the user environment map. In some implementations, the CGR environment synthesizer 540 provides the CGR environment 542 to a CGR presentation pipeline (e.g., to the CGR presenter 344 shown in FIG. 3).

Figure 6A:
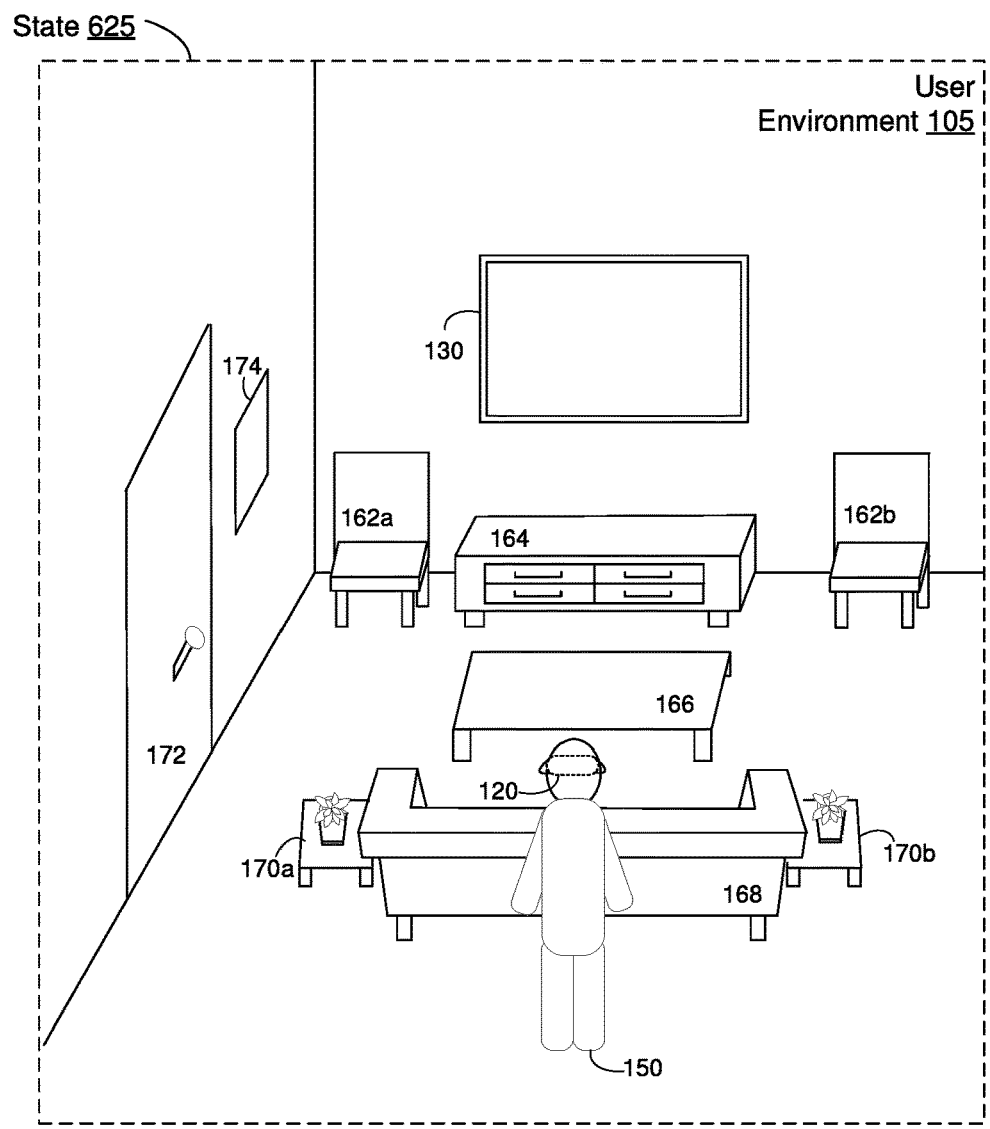
FIGS. 6A-6C illustrate an example CGR presentation scenario in accordance with some implementations.
Figure 6B:
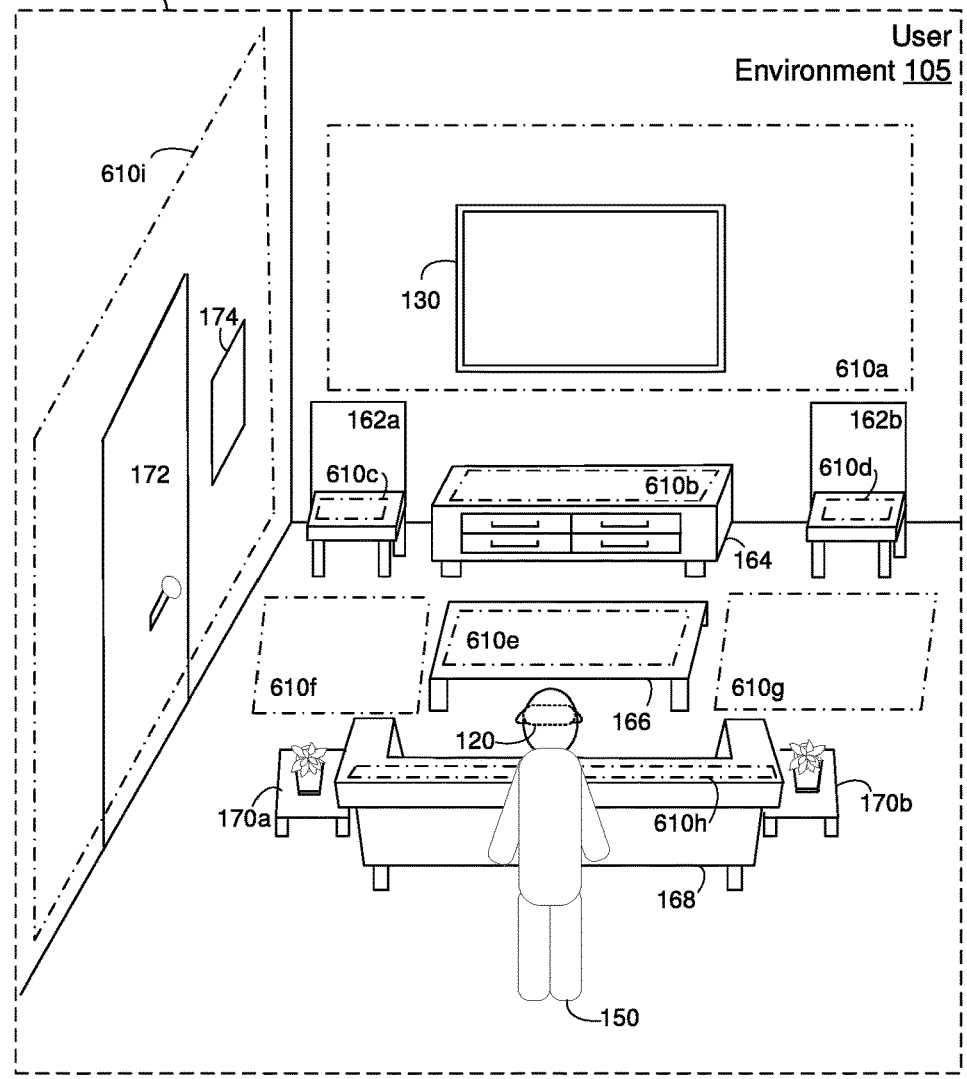
Figure 6C:
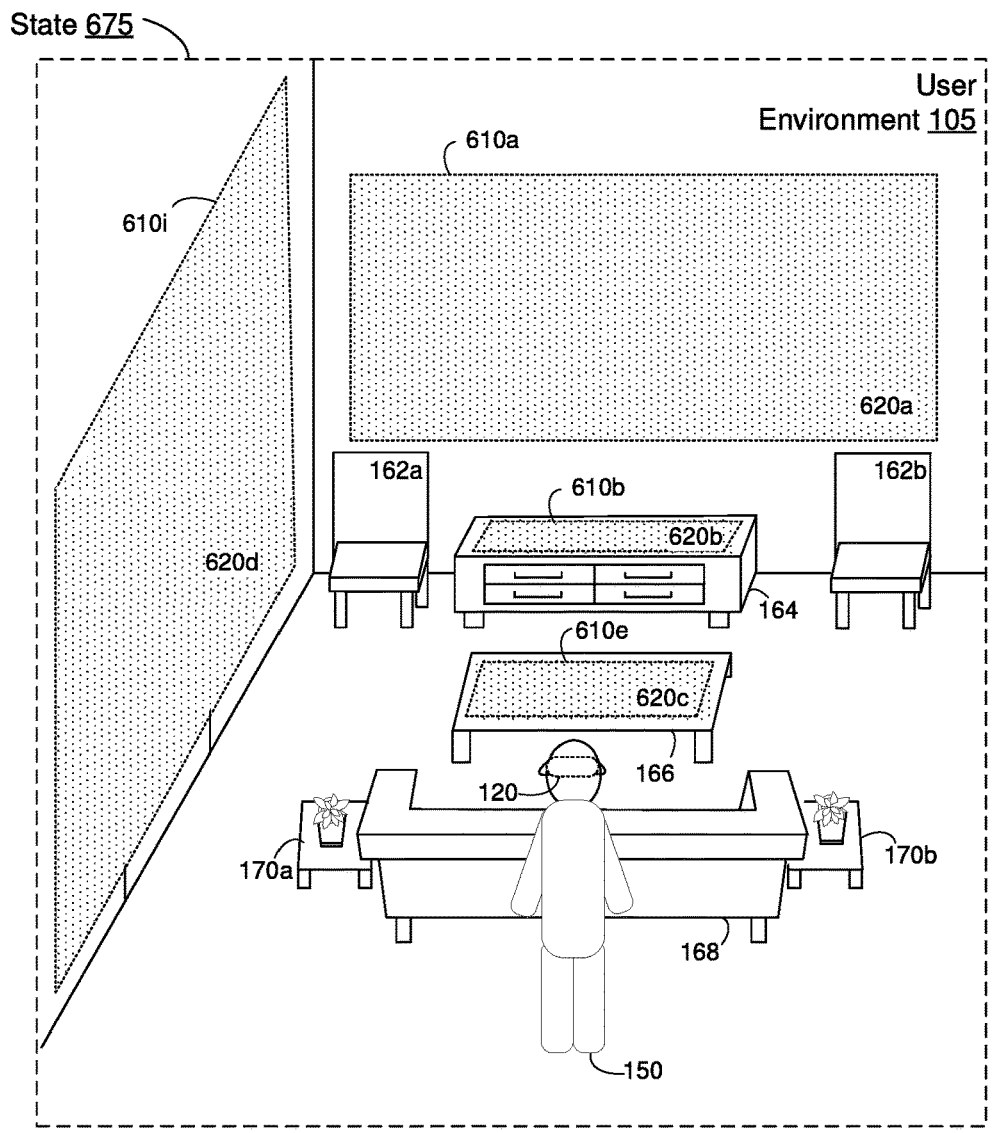

FIGS. 6A-6C illustrate an example CGR presentation scenario 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 6A, the user environment 105 includes the chairs 162a and 162b, the credenza 164, the coffee table 166, the sofa 168, the end tables 170a and 170b, the door 172 and the painting 174. As shown in FIG. 6A, the user 150 is standing behind the sofa 168 facing the display device 130 while wearing the CGR device 120 on his/her head. For example, the CGR device 120 corresponds to AR-enabled HMD (e.g., glasses, goggles, or the like) with optical see-through of the user environment 105.

As shown in FIG. 6A, in state 625 (e.g., at time T), the user 150 is standing behind the sofa 168. In some implementations, the CGR device 120 or the display device 130 displays a subtle (e.g., non-obtrusive) affordance or notification indicating that a CGR experience associated with the painting 174 is available. Continuing with this example, the controller 110 and/or the CGR device 120 detects a command issued by the user 150 to enter the CGR experience associated with the painting 174 (e.g., a voice command, gestural command, or the like). In response to detecting the command, for example, the controller 110 synthesizes a user environment map (e.g., the user environment map 522 shown in FIG. 5) of the user environment 105. In some implementations, the controller 100 synthesizes a mesh map of the user environment 105 and detects planes within the mesh map.

As shown in FIG. 6B, in state 650 (e.g., at time T+1), the controller 110 identifies planes 610a, 610b, 610c, 610d, 610e, 610f, 610g, 610h, and 610i within the user environment 105. According to some implementations, the controller 110 filters planes that do not satisfy spatial criteria. For example, the planes 610c and 610d associated with the chairs 162a and 162b, respectively, do not satisfy a dimensional criterion associated with the spatial criteria (e.g., less than M×N $cm^2$ or Y $cm^2$). In other words, the surface area of the planes 610c and 610d is too small for the placement of CGR content. For example, the planes 610f and 610g do not satisfy a line-of-sight criterion associated with the spatial criteria (e.g., more than Z degrees from the focal point of the user 150). In other words, the location of the planes 610f and 610g is too low relative to the focal point of the user 150. For example, the plane 610h does not satisfy a personal radius criterion associated with the spatial criteria (e.g., less than Q cm from the user 150). In other words, the plane 610*h* is too close to the user 150. As such, planes 610*a*, 610*b*, 610*e*, and 610*i* satisfy the spatial criteria.

As shown in FIG. 6C, in state 675 (e.g., at time T+2), the CGR device 120 presents CGR content 620*a* (e.g., a video about the artist who created the painting 174) on the plane 610*a*, CGR content 620*b* on the plane 610*b* (e.g., comments from famous art critics about the painting 174), CGR content 620*c* (e.g., a virtual cover for the credenza 164 that matches the painting 174) on the plane 610*e*, and the CGR content 620*d* (e.g., virtual decorations for the coffee table 166 that match the painting 174) on the plane 610*i*. In some implementations, the CGR content 620*a*, 620*b*, 620*c*, and 620*d* is planar or volumetric. According to some implementations, the controller 110 selects CGR content associated with the painting 174 for the detected planes that meet the spatial criteria based on the detected planes and the orientation/location of the user 150 relative to the user environment map.

Figure 7:
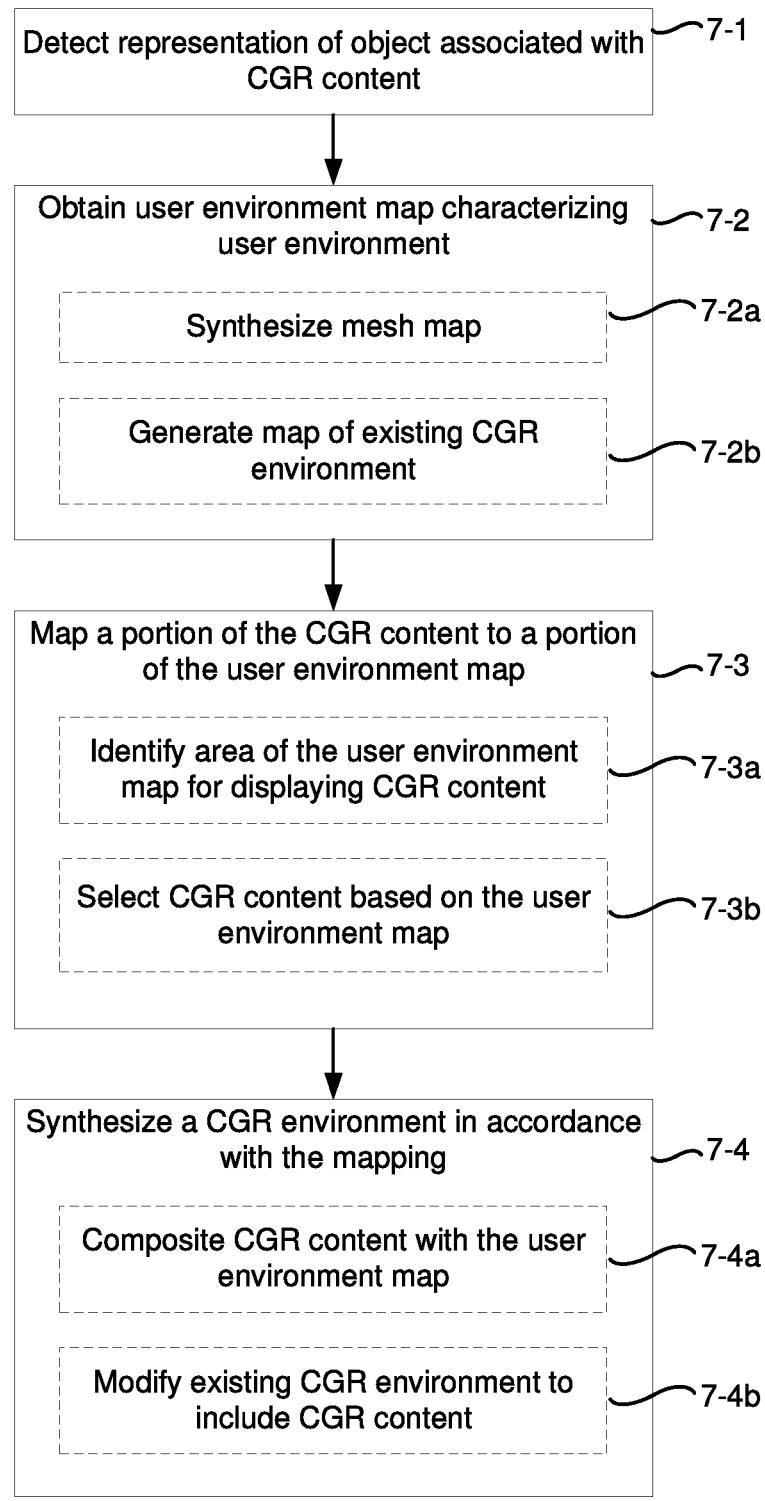
FIG. 7 is a flowchart representation of a method of tailoring a CGR experience in accordance with some implementations.

FIG. 7 is a flowchart representation of a method 700 of tailoring a CGR experience in accordance with some implementations. In various implementations, the method 700 is performed by a device with non-transitory memory and one or more processors coupled with the non-transitory memory (e.g., the controller 110 in FIGS. 1-2, the CGR device 120 in FIGS. 1 and 3, or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, in some circumstances, the method 700 includes detecting a representation of an object associated with CGR content, obtaining a user environment map characterizing a user environment, mapping a portion of the CGR content to a portion of the user environment map, and synthesizing a CGR environment in accordance with the mapping.

As represented by block 7-1, the method 700 includes detecting a representation of an object that is associated with CGR content. In some implementations, the method 700 includes detecting a representation of a real-world object. In some implementations, the method 700 includes obtaining an image captured by an image sensor, and detecting the representation of the object in the image. In some implementations, the method 700 includes detecting a representation of a virtual object. In some implementations, the method 700 includes displaying representations of a plurality of virtual objects, and detecting a selection of a representation of a first virtual object of the plurality of virtual objects.

As represented by block 7-2, the method 700 includes obtaining a user environment map characterizing a user environment. In some implementations, the user environment is bounded by depth information characterizing a volumetric region around the device. In some implementations, the user environment includes a physical environment. As represented by block 7-2*a*, in some implementations, the method 700 includes synthesizing a mesh map of a geographical area surround the user. In some implementations, the user environment includes virtual environment (e.g., a CGR environment). As represented by block 7-2*b*, in some implementations, the method 700 includes generating a map of a CGR environment associated with the user (e.g., generating a map of the virtual environment).

As represented by block 7-3, the method 700 includes mapping a portion of the CGR content associated with the object to a portion of the user environment map. As represented by block 7-3*a*, in some implementations, the method 700 includes identifying an area of the user environment map for displaying the CGR content associated with the object. As represented by block 7-3*b*, in some implementations, the method 700 includes selecting a particular CGR content item from a plurality of CGR content items based on the user environment map.

As represented by block 7-4, the method 700 includes synthesizing a CGR environment in accordance with the mapping. As represented by block 7-4*a*, in some implementations, the method 700 includes compositing at least a portion of the CGR content with the user environment map. As represented by block 7-4*b*, in some implementations, the method 700 includes modifying an existing CGR environment to include the CGR content associated with the object.

In some implementations, the method 700 includes presenting (e.g., displaying) the CGR content associated with the object. In some implementations, the method 700 includes displaying the portion of the CGR content in order to occlude at least a portion of a visual presentation of the user environment. In some implementations, the visual presentation of the user environment includes an optical see-through of the user environment. In some implementations, the visual presentation of the user environment includes a video pass-through of the user environment.

In some implementations, the method 700 includes displaying an affordance to modify a visual presentation of the user environment based on the CGR environment associated with the object. In some implementations, the method 700 includes detecting a selection of the affordance. In some implementations, the method 700 includes synthesizing the CGR environment in response to detecting the selection of the affordance.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
at a device including a display, a non-transitory memory and one or more processors coupled with the display and the non-transitory memory:
  detecting a representation of an object that is associated with computer-generated reality (CGR) content;
  obtaining an environment map characterizing an environment that includes a plurality of planar surfaces, wherein the environment is bounded by depth information characterizing a volumetric region around the device;
  selecting, based on a spatial criterion, a subset of the plurality of planar surfaces that are greater than a threshold size while filtering out planar surfaces that are smaller than the threshold size; and
  displaying, on the display, a CGR environment by overlaying a portion of the CGR content associated with the object onto the subset of the plurality of planar surfaces.
2. The method of claim 1, wherein detecting the representation of the object comprises:
  obtaining an image captured by an image sensor; and
  detecting the representation of the object in the image, wherein the object includes a real-world object.
3. The method of claim 2, wherein the image sensor includes an outward-facing camera coupled with the device, and wherein obtaining the image comprises capturing the image via the outward-facing camera.
4. The method of claim 1, wherein detecting the representation of the object comprises:
  displaying representations of a plurality of virtual objects; and
  detecting a selection of a representation of a first virtual object of the plurality of virtual objects.
5. The method of claim 1, wherein obtaining the environment map comprises:
  synthesizing a mesh map of a physical environment surrounding the device.
6. The method of claim 1, wherein obtaining the environment map comprises generating a map of an existing CGR environment associated with the device; and
  wherein synthesizing the CGR environment in accordance with the mapping comprises modifying the existing CGR environment in accordance with the mapping.

7. The method of claim 1, wherein displaying the CGR environment comprises:
  displaying an affordance to modify a visual presentation of the environment based on the CGR content associated with the object;
  detecting a selection of the affordance; and
  displaying the CGR environment in response to detecting the selection of the affordance.
8. The method of claim 1, wherein selecting the subset based on the spatial criterion comprises:
  selecting planar surfaces with a surface area that is greater than a threshold area; and
  filtering out planar surfaces with a surface area that is less than the threshold area.
9. The method of claim 1, wherein selecting the subset based on the spatial criterion comprises:
  selecting planar surfaces that intersect with a line of sight of a user of the device; and
  filtering out planar surfaces that do not intersect with the line of sight of the user of the device.
10. The method of claim 1, wherein selecting the subset based on the spatial criterion comprises:
  selecting planar surfaces that are located more than a threshold distance from a user of the device; and
  filtering out planar surfaces that are located less than the threshold distance from the user of the device.
11. The method of claim 1, wherein overlaying the portion of the CGR content onto the subset of the plurality of planar surfaces comprises:
  overlaying, onto a first planar surface in the subset, a first video, a first image or a first text string that is associated with the object; and
  overlaying, onto a second planar surface in the subset, a second video, a second image or a second text string that is associated with the object.
12. The method of claim 1, wherein overlaying the portion of the CGR content onto the subset of the plurality of planar surfaces comprises:
  overlaying, onto a first planar surface in the subset, a video that is associated with the object;
  overlaying, onto a second planar surface in the subset, an image that is associated with the object; and
  overlaying, onto a third planar surface in the subset, a text string that is associated with the object.
13. A device comprising:
one or more processors;
a display;
a non-transitory memory; and
one or more programs stored in the non-transitory memory, which, when executed by the one or more processors, cause the device to:
  detect a representation of an object that is associated with computer-generated reality (CGR) content;
  obtain an environment map characterizing an environment that includes a plurality of planar surfaces, wherein the environment is bounded by depth information characterizing a volumetric region around the device;
  select, based on a spatial criterion, a subset of the plurality of planar surfaces that are greater than a threshold size while filtering out planar surfaces that are smaller than the threshold size; and
  display, on the display, a CGR environment by overlaying a portion of the CGR content associated with the object onto the subset of the plurality of planar surfaces.

14. The device of claim 13, further comprising an image sensor, and wherein detecting the representation of the object comprises:
- obtaining an image captured by the image sensor; and
- detecting the representation of the object in the image, wherein the object includes a real-world object.

15. The device of claim 14, wherein the image sensor includes an outward-facing camera coupled with the device, and wherein obtaining the image comprises capturing the image via the outward-facing camera.

16. The device of claim 13, wherein detecting the representation of the object comprises:
- displaying representations of a plurality of virtual objects; and
- detecting a selection of a representation of a first virtual object of the plurality of virtual objects.

17. The device of claim 13, wherein obtaining the environment map comprises:
- synthesizing a mesh map of a physical environment surrounding the device.

18. The device of claim 13, wherein obtaining the environment map comprises generating a map of an existing CGR environment associated with the device; and
- wherein synthesizing the CGR environment in accordance with the mapping comprises modifying the existing CGR environment in accordance with the mapping.

19. A non-transitory memory storing one or more programs, which, when executed by one or more processors of a device that includes a display, cause the device to:
- detect a representation of an object that is associated with computer-generated reality (CGR) content;
- obtain an environment map characterizing an environment that includes a plurality of planar surfaces, wherein the environment is bounded by depth information characterizing a volumetric region around the device;
- select, based on a spatial criterion, a subset of the plurality of planar surfaces that are greater than a threshold size while filtering out planar surfaces that are smaller than the threshold size; and
- display, on the display, a CGR environment by overlaying a portion of the CGR content associated with the object onto the subset of the plurality of planar surfaces.

20. The non-transitory memory of claim 19, wherein selecting the subset based on the spatial criterion comprises:
- selecting planar surfaces with a surface area that is greater than a threshold area; and
- filtering out planar surfaces with a surface area that is less than the threshold area.

21. The non-transitory memory of claim 19, wherein selecting the subset based on the spatial criterion comprises:
- selecting planar surfaces that intersect with a line of sight of a user of the device; and
- filtering out planar surfaces that do not intersect with the line of sight of the user of the device.

22. The non-transitory memory of claim 19, wherein selecting the subset based on the spatial criterion comprises:
- selecting planar surfaces that are located more than a threshold distance from a user of the device; and
- filtering out planar surfaces that are located less than the threshold distance from the user of the device.

23. The non-transitory memory of claim 19, wherein overlaying the portion of the CGR content onto the subset of the plurality of planar surfaces comprises:
- overlaying, onto a first planar surface in the subset, a first video, a first image or a first text string that is associated with the object; and
- overlaying, onto a second planar surface in the subset, a second video, a second image or a second text string that is associated with the object.

24. The non-transitory memory of claim 19, wherein overlaying the portion of the CGR content onto the subset of the plurality of planar surfaces comprises:
- overlaying, onto a first planar surface in the subset, a video that is associated with the object;
- overlaying, onto a second planar surface in the subset, an image that is associated with the object; and
- overlaying, onto a third planar surface in the subset, a text string that is associated with the object.

* * * * *